United States Patent [19]

Hakansson

[11] Patent Number: 5,163,734
[45] Date of Patent: Nov. 17, 1992

[54] DEVICE FOR ADJUSTING OBJECTS AROUND A VEHICLE DRIVER

[76] Inventor: William Håkansson, Ekgatan 8, S-662 00 Åmål, Sweden

[21] Appl. No.: 469,408
[22] PCT Filed: Oct. 7, 1988
[86] PCT No.: PCT/SE88/00518
   § 371 Date: Apr. 3, 1989
   § 102(e) Date: Apr. 3, 1989
[87] PCT Pub. No.: WO89/03322
   PCT Pub. Date: Apr. 20, 1989

[30] Foreign Application Priority Data

Oct. 12, 1987 [SE] Sweden ............... 8703928

[51] Int. Cl.$^5$ ............................................. A47C 1/02
[52] U.S. Cl. .................... 297/330; 297/344; 297/362; 248/396; 74/89.15
[58] Field of Search ............. 297/330, 354, 361, 362, 297/344; 74/89.14, 89.15; 248/425, 393, 396, 398, 377

[56] References Cited

U.S. PATENT DOCUMENTS

| | | | |
|---|---|---|---|
| 1,582,280 | 4/1926 | Koken | 297/361 X |
| 2,668,580 | 2/1954 | Luketa | 297/330 |
| 2,668,581 | 2/1954 | Luketa | 297/330 X |
| 4,309,015 | 1/1982 | Muhr | 248/396 |
| 4,470,318 | 9/1984 | Cremer et al. | 248/396 X |
| 4,570,999 | 2/1986 | Harrison | 74/89.15 X |
| 4,653,807 | 3/1987 | Hirose et al. | 297/330 X |
| 4,832,403 | 5/1989 | Tomita | 297/330 |

FOREIGN PATENT DOCUMENTS 2134325 7/1970 Fed. Rep. of Germany.

Primary Examiner—Jose V. Chen
Attorney, Agent, or Firm—Nixon & Vanderhye

[57] ABSTRACT

Device for controlling adjustable objects around a driver in a vehicle. The device comprises a common control device for controlling at least one of the adjustment objects, and includes at least one primary gear wheel and at least one adjusting mechanism operably connected to the adjustable objects. The control device has a corresponding position for each one of the adjusting mechanisms, at least some of the adjusting mechanisms provided with a flexible rotatable shaft extending from the control device to the adjusting mechanisms, the flexible shaft corresponding to a respective adjusting mechanism and rotatable by the control device when the control device is adjusted in a position corresponding to the adjustment object. Each one of the flexible shafts has a secondary gear wheel operably engageable with the primary gear wheel. The secondary gear wheels are arranged in a star configuration which has a center coincident with the central axis of the primary gear wheel. Each of the secondary gear wheels in the star configuration is movable between a first position relative to the primary gear wheel in which the secondary gear wheel is in direct engagement with the primary gear wheel and a second position in which the secondary gear wheel is not in direct engagement with the primary gear wheel. A rotating member is provided for rotating the primary gear wheel, and an operating device is provided for establishing a power transmission between the primary gear wheel and at least one of the adjusting mechanisms via the secondary gear wheel and corresponding flexible shaft. The operating device moves the secondary gear wheel between the first and second positions to respectively establish and disestablish power transmission.

10 Claims, 4 Drawing Sheets

DEVICE FOR ADJUSTING OBJECTS AROUND A VEHICLE DRIVER

TECHNICAL FIELD

The present invention relates to a device for an optional control of at least some of the following objects positioned around a driver in a vehicle, namely the level of the front of his seat, the level of the rear of the seat, the level of the seat in its entirety, the adjustment of the seat in the longitudinal direction, the length of the seat, the inclination of the back rest, the length of the back rest, the level of the head rest, the shape of the spine rest and/or its hardness, the adjustment of the steering wheel, the angle of the steering wheel, the adjustment of the rear view mirror or mirrors as well as the level of a safety belt holder on a lateral post, the device including a common control means for a plurality of said and possibly additional adjustment objects.

STATE OF THE ART

Adjustable seats in vehicles are, when they have a simple design, only adjustable by means of a displacement of the seat and its back rest in the longitudinal direction of the seat. In a more advanced variety of such a driver's seat the back rest is adjustable in relation to the seat, the back rest being foldable forwards or backwards, at slight angles to the longitudinal direction of the seat. In an additional advanced variety of the known driver's seat the seat and its back rest can be folded about an axis, which is positioned perpendicular to the longitudinal direction of the seat, said axis preferably being positioned close to the leading edge of the seat. Also, it is known how to fold the seat either about an axis at its leading edge or about an axis at its rear edge.

The adjustment of all the known seats is done entirely manually, the person in the driver's seat leaning forwards or backwards or possibly rising somewhat from the seat. Also, it is known how to provide driver's seats with mechanical devices, which can be controlled electrically, electromagnetically, hydraulically or pneumatically. Such a driver's seat is described in German patent specification no. 2 134 325. A known electrically controlled driver's seat is provided with electrical motors, which are connected by set screws for an adjustment of the different positions of the seat and the back rest. Each one of said electrical motors is connected to an electrical switch, which is provided with an indication of the adjustment movement, which is controlled by means of the switch. It is also known how to control said switches by means of a microprocessor, which has been programmed with adjustment data relating to one or several persons.

BRIEF DESCRIPTION OF THE INVENTION

The purpose of the present invention is to provide a control means designed for controlling objects around a driver in a vehicle, primarily parts of an adjustable seat in the vehicle, which control is to be carried out in a simple manual or mechanical way. This purpose and additional purposes can be achieved according to the invention by providing each one of the possible adjustment objects with one or several adjusting devices, by assigning each one of said adjusting devices, or groups of adjusting devices, a corresponding position in said control means, by mounting, at least for some of said adjusting devices, a flexible, rotatable shaft, which extends from said control means to said adjusting device, as well as by designing that flexible shaft, which corresponds to a respective adjusting device, as an element, which can be rotated by means of said control means, provided the latter has been adjusted into the position, which corresponds to said adjustment object.

According to a preferred embodiment each one of said flexible shafts is at the end of said control means provided with one or several secondary gear wheels, while said control means comprise one or several primary gear wheels as well as means for rotating said primary gear wheel or gear wheels as well as operating devices for optionally establishing a power transmission between said primary gear wheel and one or several of said adjusting devices via said secondary gear wheels and matching flexible shaft and shafts respectively. If the devices are manually operated, it is preferred to use only one primary gear wheel, while said secondary gear wheels can be two in number, but one sole secondary gear wheel is feasible, at least in case one or several functions in the system are renounced. In fully automatically operating systems, when all the functions are performed simultaneously, preferably according to a command via a computer unit, two optionally in opposite directions operating primary gear wheels are used and preferably a sole secondary gear wheel at the end of the flexible shafts. Two or several secondary gear wheels at the end of said flexible shafts can also be used, namely in case it is desirable that the transmission ratio can be changed.

Different variants are possible within the scope of the embodiment described above. Thus, said secondary gear wheel or gear wheels can be designed to, through axial movements, engage and be disengaged from respectively said primary gear wheel or gear wheels. As an alternative, said secondary gear wheel or gear wheels can instead be designed to, through a lever movement about a pivot hinge, engage or be disengaged from respectively said driving primary gear wheel or gear wheels. It is also possible to design said secondary gear wheel or gear wheels to, through combined axial movements and lever movements, engage and be disengaged from respectively said primary gear wheel.

According to an additional variant said primary gear wheels can be designed to, through combined axial and radial movements, engage and be disengaged from respectively said secondary gear wheels.

Also, it is possible to design said secondary gear wheels to permanently engage said primary gear wheels and that said operating means include connecting means for connecting and disconnecting said flexible shafts to and from respectively an active engagement with the respective secondary gear wheels.

Said secondary gear wheels suitably are arranged in a star configuration, which however does not have to have a regular shape, the center of the star coinciding with the center of the rotary shaft of said primary gear wheel or gear wheels.

Also, said control means can include a control cam or an eccentric device, designed to, through a relative movement between said control cam or eccentric device and said secondary gear wheel, make the latter engage or be disengaged from respectively said primary gear wheels. The center of said star can be used as the rotational center of said control cam or eccentric device, which is rotatable and against which said secondary gear wheels or the carriers for these gear wheels are designed to slide, when said control cam is rotated about said rotational center.

According to an additional preferred embodiment two coaxial primary gear wheels are designed to be rotated in opposite directions about the common rotational shaft. By connecting the two primary gear wheels to different secondary gear wheels it is possible to simultaneously effect movements in several adjustment objects in desired directions of movement. For instance, in this way it is possible to raise the back rest and lower the seat simultaneously and vice versa. Thus, the variation in adjustment capacities and the speed inherent in the system are further improved in this embodiment.

Said primary and secondary gear wheels suitably are conical gear wheels in the embodiments briefly described above. However, alternative embodiments can be used, in which said primary gear wheel or primary gear wheels as well as said secondary gear wheels are straight. This is true in at least one alternative embodiment, in which one or several connecting gear wheels have been designed to optionally be connected and disconnected and to establish and interrupt respectively a power transmission between said primary gear wheel or gear wheels and at least one or several of said secondary gear wheels. Said connecting gear wheel or gear wheels can in this case for instance be moved in the space between said primary gear wheel or gear wheels and said secondary gear wheels along a circular arch having the same rotational center as said primary gear wheels.

It will be understood that all shafts between said control means and said adjusting devices do not have to be flexible, rotatable shafts. The construction according to the invention using flexible shafts can also be combined with more conventional rigid, rotatable shafts between the control means and one or several of said adjusting devices.

According to an alternative embodiment, which will not be described in detail in the following text, the control cam and its rotational shaft can be replaced by a driving shaft, which is displaceable in an axial direction and along its length provided with primary transmission means, which through the axial displacement of said driving shaft can engage and be disengaged from respectively secondary transmission means at the ends of said control means on said flexible shafts.

Additional characterizing features of and views of as well as advantages of the present invention are set forth in the patent claims and the following description of a preferred embodiment.

BRIEF DESCRIPTION OF THE DRAWINGS In the following description of two preferred embodiments reference is made to the accompanying drawings, in which.

DESCRIPTION OF PREFERRED EMBODIMENTS

Figure 1:
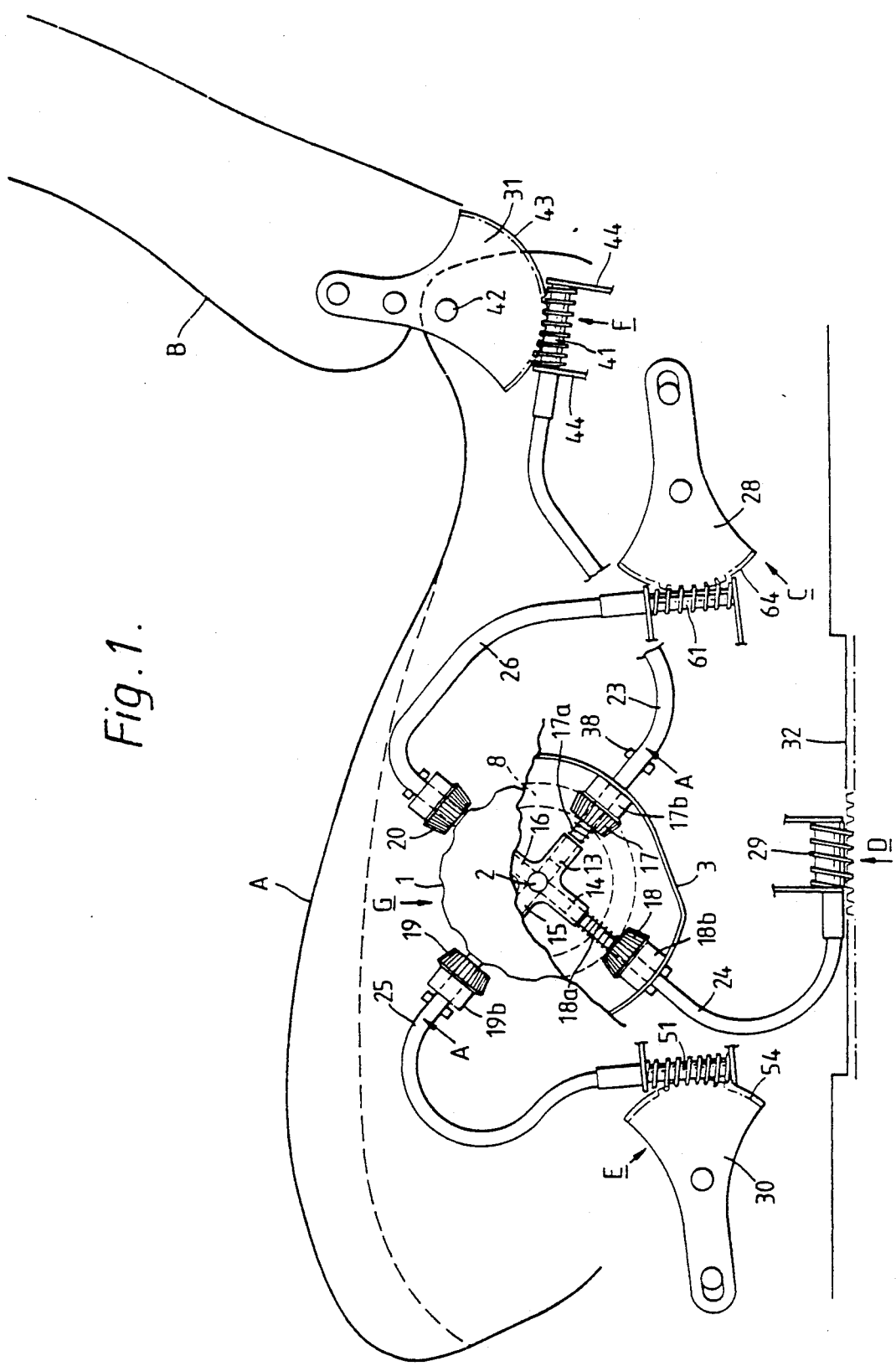
FIG. 1 is a partly schematic lateral view, which depicts the principles of the invention according to a first preferred embodiment.

FIG. 1 a vehicle seat is shown schematically, having a seat A and a back rest B. According to this embodiment the following objects are designed to be adjustable, namely the level of the rear part of the seat, the adjustment of the seat in its longitudinal direction, the level of the front of the seat, the inclination of the back rest as well as the level of seat A in its entirety. According to this embodiment four adjusting devices are provided for said five different adjustment objects or functions, namely a first adjusting device C (level adjustment of the rear part of the seat), a second adjusting device D (adjustment of the seat in its longitudinal direction), a third adjusting device E (level adjustment of the front of the seat) as well as a fourth adjusting device F (for the inclination of back rest B). In order to adjust the level of seat A in its entirety adjusting devices C and E function simultaneously.

In order to operate the four adjusting devices C-F a common control G is used. Control G includes a knob 1 having a rotary shaft 2. A cup-shaped cam (generally indicated by 3) comprises a plate 5 inside a sheet or wall 4 and a bar 6a encompassing the plate and firmly attached to plate 5, the interior side of the bar forming a control cam 6. On the interior surface of plate 5 there is a central cavity having an interior gear ring 35.

Inside cam 3 there is a rotatable wheel 7, which is slidable against plate 5 and has a conical gear ring 8. Wheel 7 has a central hole and an interior gear ring 37.

Figure 2:
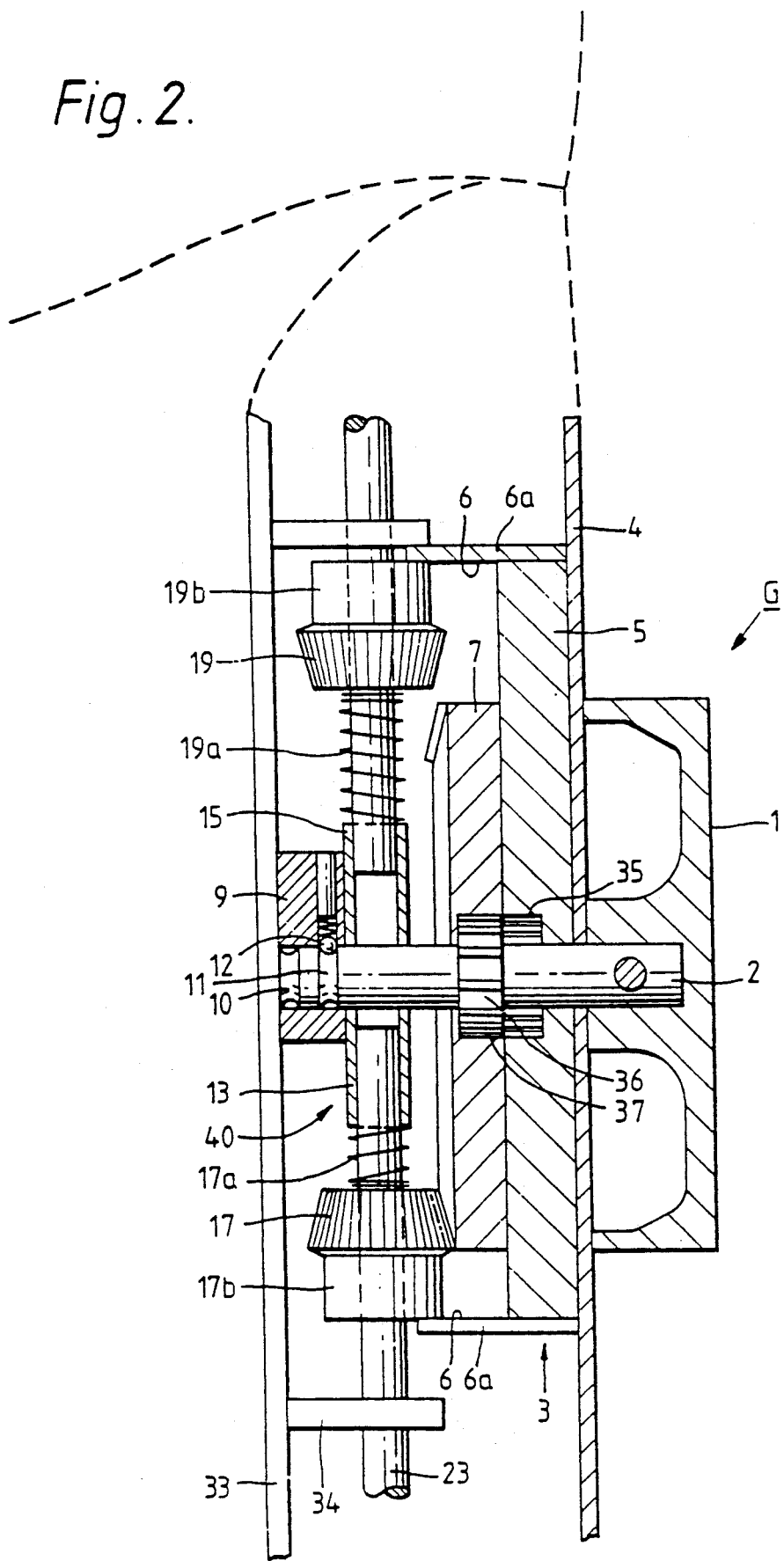
FIG. 2 is a view A—A in FIG. 1.

Shaft 2, which is rotatable by knob 1, is provided with a gear wheel 36, which through an axial displacement of shaft 2 by knob 1 can engage either gear ring 37 on gear wheel 7 or gear ring 35 in cam 3. Consequently, shaft 2 has two adjustment positions in an axial direction, namely a first position, which is shown in FIG. 2, in which knob 1 has been pushed inwardly to engage wall 4. A first groove 11 on the shaft engages then a locking ball 12 in an interior body 9, which is mounted on a stand 33. Gear wheel 36 on the shaft engages in this position gear ring 37 on gear wheel 7. By pulling knob 1 outwardly a second groove 10 at the end of shaft 2 engages locking ball 12 instead and then gear wheel 36 engages gear ring 35 in cam 3 instead.

On shaft 2 also a cross (generally indicated by 40) is slidably mounted, which is fixedly mounted in the space, i.e. it does not join shaft 2 in its rotational movements in any of the positions of the shaft. Cross 40 has four arms 13,14,15,16 according to this embodiment. At the ends of arms 13-16 there are spring-loaded gear wheels 17,18, 19 and 20 respectively. The springs are indicated by 17a, 18a, 19a and 20a. The last one is not shown in the figures. Gear wheels 17-20 are conical gear wheels, which are designed to be driven by gear ring 8, which thus is a primary transmission means, while gear wheels 17-20 are secondary transmission means. Furthermore, gear wheels 17-20 are provided with heads or carriers 17b, 18b, 19b and 20b (the last one not shown), which by an exterior edge portion engage control cam 6 and are pushed against said control cam by springs 17a-20a.

Gear wheel 17 is provided with an outgoing, flexible, rotatable shaft 23, which is mounted in a bracket 34, FIG. 2, and provided with a stop element 38, FIG. 1. Shaft 23 extends to adjusting device F for an adjustment of the inclination of back rest B. Adjusting device F comprises a worm 41 at the end of shaft 23 on the adjusting device and a position adjusting element 31, designed as a lever, rotatable about a hinge 42, one of the lever arms being designed as a gear sector 43 engaging worm 41. Worm 41 is mounted in bearings 44, which in their turn are mounted on a stand. When shaft 23 is rotated, worm 41 is rotated and consequently position adjusting element 31 is rotated about hinge 42 and back rest B is adjusted into the desired angle of inclination. Flexible shafts 25 and 26 reach in the same way adjusting devices E and C respectively, which are designed in a way which is analogous to adjusting device F described above. Thus, adjusting devices E and C will not be described in detail, but it is noted that each one of them comprises a worm 51 and 61 respectively, a position adjusting element 30 and 28 respectively and a gear sector 54 and 64 respectively.

Flexible shaft 24 belongs to adjusting device D for adjusting the seat in a longitudinal direction. Shaft 24 is also terminated with a worm 29, which in this case is designed to cooperate with a gear rack 32, which is mounted on or attached to the frame of the seat, the seat being displaced forwardly or backwardly, when worm 29 is rotated and dependent on the direction of rotation of shaft 24.

The apparatus described above is operated as follows: When adjustment objects are to be selected, knob 1 is pulled out into its outer position, and in this way gear wheel 36 engages gear ring 35. When the knob and shaft 2 is rotated in this position, cam 3 and consequently control cam 6 will rotate and in this way gear wheels 17-20 will be pushed outwards or inwards towards the center of star 40, because the gear wheels with their heads 17b-20b will slide on control cam 6. Thus, gear wheels 17-19 will, dependent on the position of knob 1, optionally engage gear ring 8.

Thus, when the desired adjustment object has been selected, by rotating knob 1 in its outer position, knob 1 and consequently also shaft 2 is pushed into its inner position and in this position gear wheel 36 will instead engage gear ring 37 in gear wheel 7, FIG. 2. When knob 1 is rotated in this position, gear wheel 7 and consequently also gear ring 8 and also the gear wheel or gear wheels, e.g. gear wheel 17 in FIG. 2, which engage gear ring 8, will rotate. In this way the rotational shaft, e.g. shaft 23 in FIG. 2, outgoing from the selected gear wheel, e.g. gear wheel 17, will rotate. By rotating shaft 23 or any of the remaining shafts 24-26, when another position has been selected, the selected adjusting device C-G will be influenced. Thus, by rotating shaft 23 worm 41 rotates in order to, in a way that it is not necessary to explain, influence position adjusting element 31, in order to give back rest B its desired angle of inclination.

In this way each one of adjusting devices C, D, E and F can be selected and operated, when matching gear wheels 17-20 has engaged gear ring 8. In one of the adjustment positions of central cam 6, two secondary gear wheels are engaged, namely gear wheels 19 and 17, and in this way seat A can be raised or lowered in its entirety.

Figure 3:
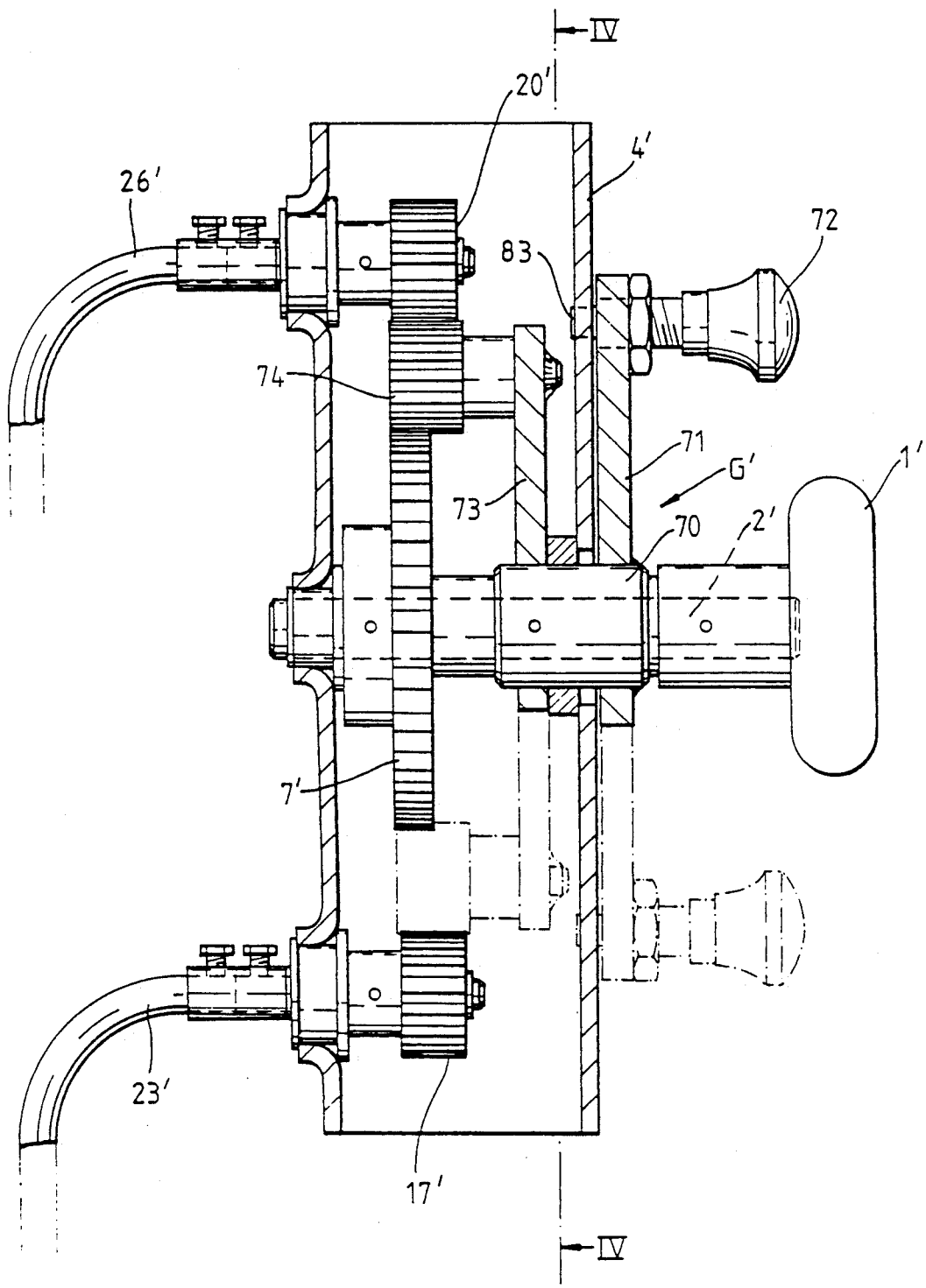
FIG. 3 shows the principle of another preferred embodiment, seen in the same direction as the view in FIG. 2.
Figure 4:
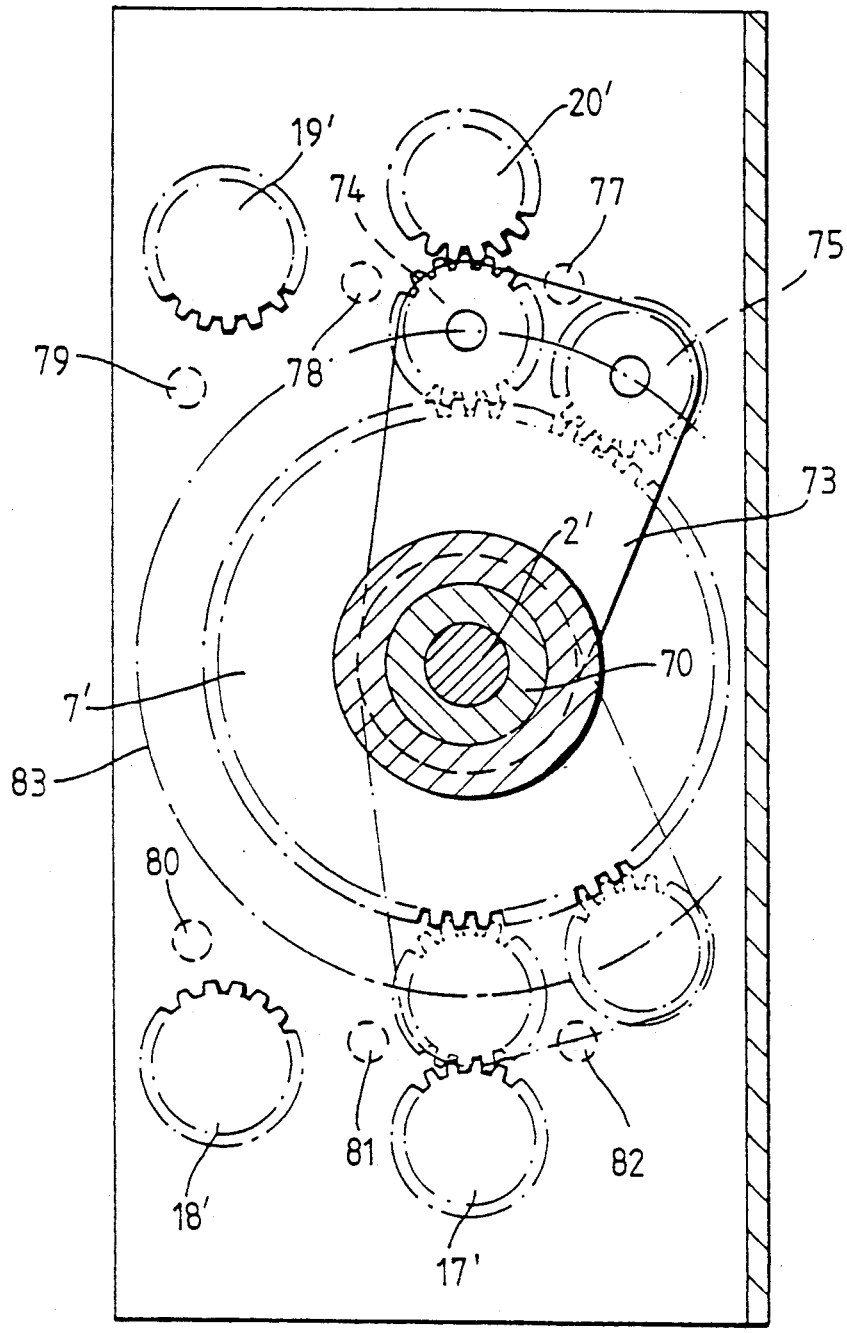
FIG. 4 is a view IV—IV in FIG. 2.

In the second embodiment of a control means, shown in FIGS. 3 and 4 and indicated by G', elements which have direct equivalents in the embodiment described above have the same reference numerals with the addendum mark '. Thus, a shaft 2' is provided, which is rotatable by a knob 1' in order to rotate a primary gear wheel 7' having straight cogs. Four secondary gear wheels 17', 18', 19' and 20' are also provided. They are also provided with straight cogs. A rotatable sleeve 70 is provided on shaft 2'. On the exterior side of wall 4' an operating arm 71 having a handle 72 is provided. Operating arm 71 is welded to sleeve 70. Inside wall 4' there is a carrier arm 73, which is screwed to sleeve 70 in order to join the sleeve in its rotational movements, which are affected by handle 72 and operating arm 71. At the outer end of carrier arm 73 there are two connecting gear wheels 74, 75, which are designed to, dependent on the position of carrier arm 73, connect primary gear wheel 7' with one or several of secondary gear wheels 17'-20'. According to this embodiment carrier arm 73 can occupy six different positions, which are defined by six apertures 77,78,79,80,81 and 82 in wall 4'. For this purpose a pin 83 is provided in the inner end of handle 72. Pin 83 can, according to known principles, optionally be placed in holes 77-82 and is spring-loaded.

In the position shown in FIGS. 3 and 4 pin 83 is mounted in aperture 77, one 74 of said connecting gear wheels engaging primary gear wheel 7' as well as secondary gear wheel 20'. By locking pin 83 and, by means of handle 72 and operating arm 71, moving carrier arm 73 to a position corresponding to aperture 78, connecting gear wheels 74,75 are moved in the space between primary gear wheel 7' and said secondary gear wheels along a circular arc 83, which is coaxial in relation to primary gear wheel 7'. Said two connecting gear wheels 74 and 75 can through this movement engage the respective secondary gear wheels 19' and 20' in order to simultaneously perform functions, e.g. a raising or a lowering of the front as well as the rear part of a seat in the vehicle via flexible shafts, connected to said adjusting devices, which can be designed in the same way as in the embodiment described above. In FIG. 3 only two flexible shafts are shown, which are indicated by 23' and 26'. In the first-mentioned position 77 only the rear part of the seat may be raised via flexible shaft 26'. In case carrier arm 73 subsequently is rotated to position 79, carrier gear wheel 75 will engage secondary gear wheel 19', and in this case only the front of the seat will be raised or lowered, when shaft 2' is rotated, by means of knob 1'. When carrier arm is rotated further to said three lower positions 80, 81 and 82, additional functions can be selected in an analogous way. It is evident, that FIGS. 3 and 4 only depict the principles of how a control means can be designed and perform according to this alternative operating principle. Said principle can be developed in order to simultaneously perform more functions than two, e.g. the ones described above. In this case e.g. several carrier arms can be mounted, the movements of which can be carried out automatically according to a program in a computer unit, designed to control the movements. Additional details which can be integrated into the system are e.g. gear wheels designed to change the rotational directions of the flexible shafts. They can be mounted in the control means or connected to the adjusting devices.

I claim:

1. A device for optionally controlling adjustable objects around a driver in a vehicle, said device comprising:

a common control means for controlling at least one of said adjustable objects, said control means including at least one primary gear wheel having a central axis;

at least one adjusting means operably connected to at least one of said adjustable objects for adjusting at least one of said adjustable objects, said common control means having a corresponding position for each one of said adjusting means, at least some of said adjusting means being provided with a flexible rotatable shaft extending from said common control means to said adjusting means, said flexible shaft corresponding to a respective adjusting means and being rotatable by said common control means when said common control means is adjusted in a position corresponding to said adjustable object, each one of said flexible shafts having a secondary gear wheel operably engageable with said at least one primary gear wheel, said secondary gear wheels being arranged in a star configuration having a center coincident with said central axis of said primary gear wheel, each of said secondary gear wheels in said star configuration being movable between a first position relative to said primary gear wheel in which said secondary gear wheel is in direct engagement with said primary gear wheel and a second position in which said secondary gear wheel is not in direct engagement with said primary gear wheel;

rotating means for rotating said at least one primary gear wheel; and operating means for moving said secondary gear wheel between said first and second positions to establish and disestablish respectively power transmission between said at least one primary gear wheel and at least one of said adjusting means via said secondary gear wheel and corresponding flexible shaft.

2. A device according to claim 1, wherein said secondary gear wheels are axially movable whereby said gear wheels are engageable and disengageable with a respective at least one primary gear wheel.

3. A device according to claim 1, wherein said secondary gear wheels are engageable and disengageable with a respective at least one primary gear wheel through combined axial and lever movements.

4. A device according to claim 1, wherein at least one primary gear wheel is axially and radially movable and engageable and disengageable with a respective secondary gear wheel.

5. A device according to claim 1, wherein said secondary gear wheels are engaged with at least one primary gear wheel, and said operating means includes connecting means for engaging said flexible shafts and respective secondary gear wheels and disengaging them from a respective secondary gear wheel.

6. A device according to claim 1, and further comprising a control cam in abutting engagement with said secondary gear wheels, said control cam, through relative movement between said control cam and said secondary gear wheels, engaging said secondary gear wheels and at least one primary gear wheel and disengaging said secondary gear wheel and said at least one primary gear wheel.

7. A device according to claim 6, wherein said control cam is rotatable, said center of said star configuration being a rotational center for said control cam, said secondary gear wheel being slidable against said control cam when said control cam is rotated about said rotational center.

8. A device according to claim 6, and further comprising turning means for rotating said control cam and said at least one primary gear wheel, said turning means being displaceable between a first engagement position in which said turning means rotates said at least one primary gear wheel and a second engagement position in which said turning means rotates said control cam.

9. A device according to claim 1, wherein said primary and secondary gear wheels are conical gear wheels.

10. A device according to claim 1, wherein there are provided two primary gear wheels, said primary gear wheels being coaxial and rotatable in opposite directions about a common rotational shaft, said two primary gear wheels, independent of each other, being engageable with secondary gear wheels in order to control said adjusting means via said secondary wheels and said flexible shafts when said primary gear wheels are rotating in opposite directions.

* * * * *